Sept. 25, 1928.
C. H. WHITE
SCRAPER
Filed May 5, 1923
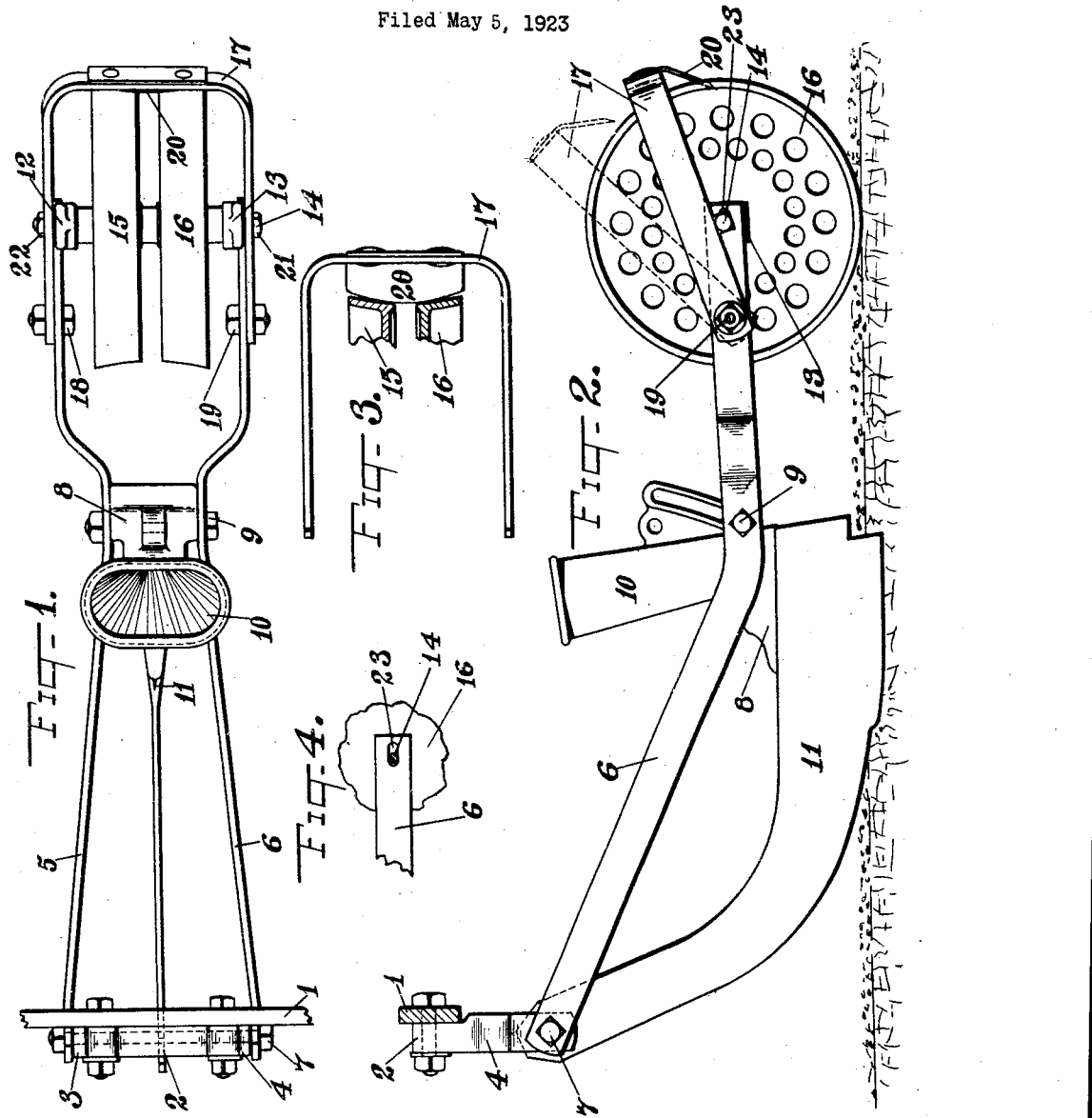
Inventor:
Charles H. White
by W.C. Jordinston
Attorney
Witness:
E. Wilderson Patented Sept. 25, 1928.

1,685,385

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

SCRAPER.

Application filed May 5, 1923. Serial No. 636,900.

My invention relates to that class of devices commonly employed for the purpose of removing soil accumulated on the tread surface of wheels more particularly in certain types of agricultural machinery, and an object of my invention is to provide a device having a movement relative to the tread surface of a wheel by which the latter is more effectively cleared of adhering soil, other objects being disclosed in the following specification.

Referring to the drawings, in which similar numerals indicate identical parts—

Figure 1 is a plan view of my device as applied to a planter, sufficient of the latter being shown to illustrate the operation of my invention. Figure 2 is a side elevation of Figure 1. Figure 3 is an enlarged detail of my device, and Figure 4 is a detail illustrating wheel adjustment.

To a frame bar 1 of a planter is rigidly secured a member 2 having depending arms 3 and 4. A bar 5 is secured to the arm 3 and a similar bar 6 is secured to the arm 4; both bars 5 and 6 are secured in place by a bolt 7. The bars 5 and 6 extend convergingly rearward of a casting 8 which is secured between the bars by a bolt 9 and includes a boot or seed tube 10. The casting 8 is connected to a shoe or furrow opener 11 the forward end of which is attached to the bolt 7, the boot and shoe being of a well known type. From the casting 8 the bars 5 and 6 diverge for a short part of their length and then extend rearwardly in parallelism and on their rear ends are mounted, respectively, bearings 12 and 13 in which is supported an axle 14 having journaled thereon a wheel formed preferably in two sections 15 and 16, spaced apart, and operating as a covering wheel and also as a supporting wheel for the shoe 11 and attached parts, and as a depth regulator.

An arched member 17 straddles the wheel and is pivotally attached on the bars 5 and 6, respectively, forwardly of the axle 14, by bolts 18 and 19, and centrally on the arch 17 a scraper blade is rigidly secured and extends downwardly and at an angle toward the wheel rim. The operative edge of the scraper blade is arcuate to accommodate the curved surface of the tread of the sections 15 and 16 of the wheel, as more clearly shown in Figure 3.

The normal position of the arched member 17 and the scraper blade is as shown in Figure 2, the squared head 21 of the axle 14 and the nut 22 on the opposite end thereof operating as stops on which the arched member 17 rests in its lowest position or when the tread of the wheel is free from adhering soil. When soil accumulates on the tread surface of the wheel and is compacted sufficiently to resist the action of the scraper blade, the arched member 17 and scraper blade 20 are raised; the arched member 17, however, as stated, is pivotally supported on the bars 5 and 6, forwardly of the axle 14, consequently, the arc of movement of the scraper blade is eccentric to the axis of the axle 14, and as the arched member 17 rises the scraper blade 20 recedes from the tread surface of the wheels as shown in dotted lines in Figure 2. The distance of recession of the scraper blade 20 is governed by the height to which the arched member 17 is raised by soil accumulated on the tread surface of the wheel and its compactness to resist the action of the scraper blade 20, but this height does not exceed that shown in dotted lines in Figure 2.

Gravity acts to keep the scraper, and its support, down against the upthrust of the soil accumulated on the surface of the wheel, and as this accumulation will vary in thickness the scraper and the support therefor will rise or fall accordingly; the repeated rise and fall of the arched member 17 imparts a vertically oscillating or chopping action to the scraper blade 20, consequently soil adhering to the tread surface of the wheel is readily and effectively removed. Continued operation of the scraper blade 20 will result in more or less wear of the edge thereof, and to compensate for such wear I have made the wheels adjustable toward or from the edge of the scraper blade 20 by providing a slot 23 in each of the bars 5 and 6 in which the axle 14 is supported, so that by loosening the nut 22, the axle 14 can be moved in the slots 23 to adjust the wheels 5 and 6 toward or from the scraper blade to the desired degree.

I do not limit myself to the shape of the scraper blade nor to the type of the wheel shown, for it is evident they may be varied without departure from the spirit of my invention.

What I claim is—

The combination of a frame; a ground wheel supported on the frame; a support pivotally mounted on the frame forwardly of the axis of the ground wheel, extending rearwardly and having a vertically swinging movement about said pivot; a scraper secured on said support and movable bodily therewith; said support and scraper adapted to be swung upwardly by an increase of soil on the wheel tread, and dropping back to primal position by gravity in an arc eccentric to the axis of said wheel whereby the scraper operates with a chopping effect on soil on the wheel tread; and a stop to limit the downward movement of said support and scraper.

CHARLES H. WHITE.